Feb. 1, 1955        A. A. ROOT        2,700,896
ELECTRIC TORQUE METER
Filed Feb. 14, 1951
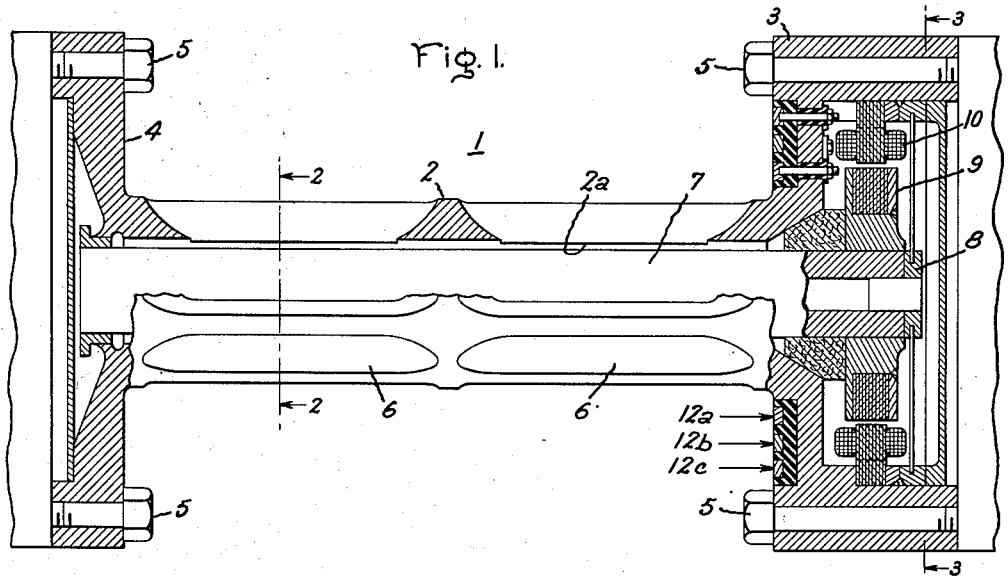
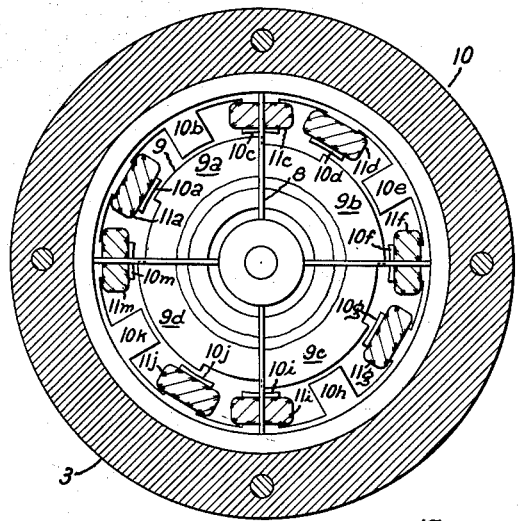
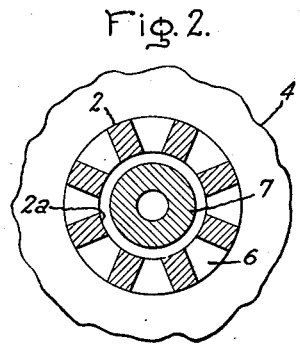
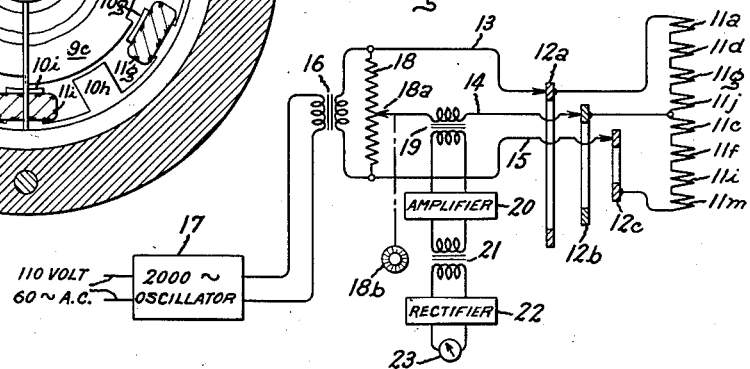
Inventor:
Augustin A. Root,
by Paul A. Frank
His Attorney.

# United States Patent Office 2,700,896
Patented Feb. 1, 1955

2,700,896

ELECTRIC TORQUE METER

Augustin A. Root, Rotterdam, N. Y., assignor to General Electric Company, a corporation of New York Application February 14, 1951, Serial No. 210,863

2 Claims. (Cl. 73—136)

This invention relates to torquemeters and, more particularly, to those torquemeters which employ electrical means to give a measurement of a mechanical torsional stress.

This invention is closely related to the copending application of Hans P. Kuehni, Serial No. 780,089, entitled "Electrical Torquemeter," filed October 15, 1947, and assigned to the same assignee as the present invention, which issued August 14, 1951 as Patent 2,564,484.

An object of this invention is to provide an improved torquemeter for giving an electrical response proportional to the torsional force transmitted by a rotating shaft.

A further object of this invention is to provide a new and improved shaft for torquemeters designed to give an electrical response proportional to the torsional force transmitted by a rotating shaft.

The torquemeter of this invention employs the well known principle that the amount of twist occurring in a rotating shaft under load is proportional to the torque being transmitted by the shaft. Thus, the torquemeter measures torque by electrically gauging the angle of twist occurring between the two ends of a shaft of a definite predetermined length as the shaft transmits the torque to be measured.

The torquemeter of this invention, however, differs from any other torquemeter heretofore available in that its gauging shaft is provided with a plurality of slots having longitudinal axes parallel to the axis of the shaft. These slots provide a greater twist angle per inch of shaft per foot-pound of transmitted torque, and thus for a given torque, permit employment of a shorter shaft of larger diameter than previously has been possible. The major advantage of this is that the shorter and thicker is the shaft, the greater is its stiffness to bending and therefore the greater is the maximum speed at which it may be operated. By the use of a properly designed slotted shaft, torquemeters may be constructed which can operate at speeds several times the speed heretofore regarded as the maximum possible. For example, a torquemeter employing such a slotted gauging shaft has given accurate results at 20,000 R. P. M.

The features of this invention which are believed to be novel and patentable are set forth in the appended claims. For a better and more complete understanding of the invention, together with additional objects and advantages thereof, reference should now be had to the following description and accompanying drawing in which:

Fig. 1 is a longitudinal view, partially in section of a torquemeter embodying this invention;

Fig. 2 is a cross-sectional view taken on the line 2—2 of Fig. 1, showing one manner of slotting the gauging shaft of the torquemeter;

Fig. 3 is a cross-sectional view, taken on the line 3—3 of Fig. 1, showing the electromagnetic gauge head used in the torquemeter; and Fig. 4 is a diagram, partially in block form, of an electrical circuit for use with the torquemeter of Fig. 1.

Referring to Fig. 1, in a preferred embodiment of this invention, the torquemeter is adapted to be coupled between adjacent sections of any shaft in which a measurement of the torque loading is desired. The torquemeter, when coupled between the shaft sections, in effect becomes, itself, a section of the shaft, and any load placed on the shaft is transmitted through it. The principal or gauging shaft 2 of torquemeter 1 contains a center bore 2a and is provided at one end with a hollow flange structure 3 and at the other end with an indexing flange structure 4. It is by means of flange structures 3 and 4 and bolts, such as bolt 5, that torquemeter 1 is connected between adjacent sections of the shaft whose torque loading is to be measured.

The length of shaft 2 is of a predetermined magnitude dependent upon the amount of torque which torquemeter 1 is intended to measure. Cut in shaft 2 are a plurality of circumferentially spaced slots 6 which have longitudinal axes parallel to the axis of shaft 2, and inwardly converging planar sides. Slots 6 increase the torsional flexibility of shaft 2 without materially decreasing its stiffness to bending. Shaft 2 as including slots 6 is designed to twist within combined torsional and bending stress limits in proportion to the torque being transmitted by it, and provides a definite gauge length in which the twist can be measured.

Fig. 2, a cross-section through 2—2 of Fig. 1, illustrates one manner in which slots 6 may be cut in shaft 2. The exact size and shape of slots 6, as well as the number thereof, vary with the strength of shaft desired. The dimensions of the slots, and thus the dimensions of the bars remaining after the slots are cut, are determined both by the torque which the torquemeter must transmit and by the centrifugal force acting on the bars at maximum rated speeds of the torquemeter. Actually although the shaft itself deflects as though in torsion, the bars are subjected to combined bending and torsional stresses. The transmitted torque causes the bars to twist around their own axes and to bend in a direction perpendicular to a radius of the shaft. This produces maximum stresses on the faces of the bars parallel to a radius of the shaft. The centrifugal force, however, causes the bars to bow out and thus produces maximum stresses on the inner and outer faces of the bars, i. e., on the faces normal to a radius of the shaft. For best results, the cross-sectional dimensions of the bars are designed so that the above-mentioned stresses combine to produce substantially uniform stresses on all surfaces and edges of the bars.

It has also been found advantageous to curve the end portions of slots 6, somewhat as indicated in Fig. 1. This curved end shape appreciably reduces stress concentrations. Moreover, to keep the resistance of the gauging shaft to centrifugal force high after the slots have been cut, it has been found ordinarily best to leave the center portion of the shaft unslotted, cutting slots on both sides of the center portion rather than cutting long slots from one end of the gauging shaft to the other end. Leaving the center portion of the shaft unslotted results in a web-like structure such as is shown in Fig. 1.

Axial bore 2a of the shaft 2 contains a reference pin 7 which is firmly attached to indexing flange structure 4 at its one end and is supported by a flexure assembly 8 at its other end. Flexure assembly 8 is mounted on flange structure 3 and provides a bearing action enabling the end of pin 7 associated with it to rotate through small angles with respect to flange structure 3. Reference pin 7 does not transmit any torque, but rather transmits the angular position or twist of flange structure 4 to the electromagnetic gauge head contained in flange structure 3 as shaft 2 twists under load. In other words, reference pin 7, since it is fixed with respect to one end of shaft 2 but can rotate with respect to the other end, transfers the twist position of the end of shaft 2 associated with flange structure 4 to the electromagnetic gauge head mounted in flange structure 3. It is by measurement of this shaft twist that the magnitude of the transmitted torque is determined.

The electromagnetic gauge head contained in flange structure 3 consists of a magnetic rotor member 9 which is mounted on the rotatable end of pin 7 in cooperative flux linking relationship with a magnetic stator member 10 which is firmly secured to flange structure 3 itself, rotor member 9 being relatively rotatable with respect to stator member 10. Magnetic members 9 and 10 each have a number of salient pole pieces, rotor member 9 having pole pieces 9a, 9b, 9c and 9d and stator member 10 having pole pieces 10a, 10b, 10c, 10d, 10e, 10f, 10g, 10h, 10i, 10j, 10k and 10m. Each pole piece of rotor member 9 is magnetically associated with a group of three of the pole pieces of stator member 10. Thus, pole piece 9a is associated with pole pieces 10a, 10b and 10c; pole pieces 9b with pole pieces 10d, 10e and 10f; pole piece 9c with pole pieces 10g, 10h and 10i; and pole piece 9d with pole pieces 10j, 10k and 10m. The pole pieces of rotor member 9 are of such size and are so positioned relative to those of stator member 10 that in the no torque position each rotor pole piece covers all the area bordering the center pole of the group of three stator pole pieces associated with it but covers only half the area bordering each of the outside two pole pieces of the group. For example, pole piece 9a covers all the area bordering pole piece 10b and half the area bordering pole pieces 10a and 10c.

In each group of three stator pole pieces, the center pole piece has no winding on it, while the two outside pole pieces are wound with substantially identical coils. Thus, pole pieces 10b, 10e, 10h and 10k hold no windings, while pole pieces 10a, 10c, 10d, 10f, 10g, 10i, 10j and 10m are respectively wound with substantially identical coils 11a, 11c, 11d, 11f, 11g, 11i, 11j and 11m. Excitation is supplied to these coils through slip rings 12a, 12b and 12c.

One manner in which these coils may be connected electrically is shown in Fig. 4. The coils 11a, 11d, 11g and 11j on the outside left stator pole pieces are serially connected between slip rings 12a and 12b, while the coils 11c, 11f, 11i and 11m on the outside right stator pole pieces are serially connected between slip rings 12b and 12c. Slip rings 12a, 12b and 12c are respectively connected through brush means to the conductors 13, 14 and 15 of a 3-wire measuring circuit. Although the series connection of the coils between the outside conductors 13 and 15 and the center conductor 14 is the preferred circuit, any connection of the coils whereby the coils 11a, 11d, 11g and 11j between conductors 13 and 14 are connected in an identical parallel or series-parallel circuit as the coils 11c, 11f, 11i and 11m between conductors 14 and 15 may be employed with the 3-wire measuring circuit illustrated.

The measuring circuit is energized at a substantially constant voltage by a transformer 16 connected across conductors 13 and 15. The constant excitation for transformer 16 is supplied by an oscillator, such as the 2000-cycle-per-second oscillator 17. Also connected across conductors 13 and 15 is a potentiometer 18. A slider or tap 18a movable along potentiometer 18 for selecting any portion of the voltage appearing across it is connected to conductor 14 through the primary coil of a transformer 19. A dial 18b is mechanically connected to tap 18a so that the position of the tap may be readily determined. Connected across the secondary of transformer 19 is an amplifier 20, the output of which is fed to another transformer 21. The signal from transformer 21 is supplied to a rectifier 22 and the output of rectifier 22 is fed to a current indicating device 23. Indicating device 23 is thus actuated by transformer 19 through rectifying and amplifying means.

In the no torque, unstressed position of shaft 2 and with an alternating voltage applied between wires 13 and 15, all coils 11a, 11c, 11d, 11f, 11g, 11i, 11j and 11m produce the same amount of magnetic flux, since all are identical coils carrying identical currents and are opposed by the same magnetic reluctance. Moreover, the voltage drop across the group of coils between conductors 13 and 14 is equal to the voltage drop across the group of coils between conductors 14 and 15.

Now, however, as a load is transmitted by shaft 2, the shaft twists in proportion to the torque being transmitted. Since rotor member 9 is fixed through reference pin to flange structure 4 and stator member 10 is secured to flange structure 3, there will be an angular displacement between members 9 and 10 due to the twisting of shaft 2.

This turning of rotor member 9 relative to stator member 10 causes a different magnetic reluctance to be presented to the group of coils positioned on the left-hand pole pieces, e. g., coils 11a, 11d, 11g and 11j, than to the group of coils positioned on the right-hand pole pieces, e. g., coils 11c, 11f, 11i and 11m. Thus, depending upon the direction in which the load is being transmitted, one group of coils will have an increased inductance, while the other group of coils will have a decreased inductance. Or, in other words, the applied voltage being kept constant, and identical current flowing through all the coils, more flux will now link one group of coils than will link the other group of coils.

Assuming a movement of member 9 in a clockwise direction as viewed in Fig. 3, coils 11c, 11f, 11i and 11m will have an increase in inductance, while coils 11a, 11d, 11g and 11j will have a corresponding decrease in inductance. With the applied voltage from transformer 16 remaining constant, this change in inductance will cause the voltage drop across the associated coils to change or shift proportionately. Thus, the voltage between conductors 13 and 14 will decrease while the voltage between conductors 14 and 15 will increase. Now, since the shift in voltage is dependent upon the shift in inductance, the shift in inductance dependent upon the angular displacement of rotor member 9 from stator member 10, and the angular displacement of member 9 from member 10 dependent upon the amount of twist of shaft 2, the shift in voltage is, therefore, dependent upon the amount of twist of shaft 2. And, since the amount of twist of shaft 2 is directly dependent upon the torque being transmitted, therefore, the shift in voltage is dependent on the torque being transmitted.

The magnitude of the shift in voltage is measured by changing the position of tap 18a on potentiometer 18 until meter 23 gives a zero reading indicating zero current flow in conductor 14. Since the closed loop formed by the rotor coils, e. g. coils 11a through 11m, and potentiometer 18, as split in two sections by tap 18a, may be likened to a bridge circuit whose balance is indicated by meter 23, a zero reading on meter 23 indicates the voltage drops across potentiometer 18 between conductor 13 and tap 18a, and between tap 18a and conductor 15 respectively equal the drops across the rotor coils between conductor 13 and conductor 14 and between conductor 14 and conductor 15. The voltage shift in the rotor coils may thus be measured by ascertaining the physical position of tap 18a by means of dial 18b. The scale of dial 18b may be calibrated directly in torque units.

Other measuring circuits and gauge heads besides those shown in the preferred embodiment illustrated in the diagram may be used with the torquemeter of this invention. The use of a slotted shaft of predetermined gauge length, however, enables a finer determination of torque than previously available, no matter what type of gauge head or measuring circuit is used.

While what has been described is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. A device for measuring the mechanical torque transmitted by a rotating shaft comprising a gauging shaft of predetermined length containing an axial bore, and provided with a hollow flange structure at one end thereof, with an indexing flange structure at the other end thereof, and with a plurality of circumferentially spaced slots positioned on both sides of the center portion thereof having curved end portions and longitudinal axes parallel to the axis thereof; connections for inserting said gauging shaft between adjacent sections of said rotating shaft to transmit said torque and to twist within safe combined stress limits in proportion to said torque; a reference pin contained within said axial bore and firmly attached to said indexing flange structure; flexure means supporting said reference pin within said axial bore at the hollow flange end thereof to provide for limited relative motion between said pin and said hollow flange structure; and an electromagnetic gauge head contained within said hollow flange structure, said electromagnetic gauge head comprising a magnetic rotor member secured to the end of said reference pin and a magnetic stator member secured to said hollow flange structure in magnetic flux linking relation with said rotor member, said magnetic stator member having a plurality of salient pole pieces arranged in groups of three with the outer pole pieces of each group having coils wound thereon, means for energizing said coils, a plurality of salient pole pieces on said magnetic rotor member corresponding to the plurality of groups of stator pole pieces, each of said rotor pole pieces being in cooperative flux linking relationship with a group of said stator pole pieces, whereby any rotational displacement of said rotor member relative to said stator member changes the relative magnitudes of the magnetic flux linking said rotor member with the outer pole pieces of each stator pole group and thereby causes a difference in the relative magnitudes of the voltage drops across the coils of said outer pole pieces; and means responsive to said difference in the relative magnitudes of the voltage drops across the coils of the outer pole pieces of said stator pole groups for indicating the relative angular displacement between said rotor and stator members.

2. A device for measuring the mechanical torque transmitted by a rotating shaft comprising a gauging shaft of predetermined length containing an axial bore, and provided with a hollow flange structure at one end thereof, with an indexing flange structure at the other end thereof, and with a plurality of circumferentially spaced slots positioned on both sides of the center portion thereof having curved end portions and longitudinal axes parallel to the axis thereof, said slots having substantially planar sides converging toward the axis of said center portion of said gauging shaft; connections for inserting said gauging shaft between adjacent sections of said rotating shaft to transmit said torque and to twist within safe combined stress limits in proportion to said torque; a reference pin contained within said axial bore and firmly attached to said indexing flange structure; flexure means supporting said reference pin within said axial bore at the hollow flange end thereof to provide for limited relative motion between said pin and said hollow flange structure; and an electromagnetic gauge head contained within said hollow flange structure having a plurality of relatively rotatable flux producing magnetic members in cooperative flux linking relationship, one of said members being secured to the end of said reference pin and the other of said members being secured to said hollow flange structure; and means electrically connected to said electromagnetic gage head and responsive to the distribution of the flux linking said magnetic members for electrically measuring the relative angular displacement between said members.

References Cited in the file of this patent

UNITED STATES PATENTS

| | | |
|---|---|---|
| 1,227,043 | Cummings | May 22, 1917 |
| 2,219,632 | Naden | Oct. 29, 1940 |
| 2,260,036 | Kuehni | Oct. 21, 1941 |
| 2,329,121 | Lamberger et al. | Sept. 7, 1943 |
| 2,476,410 | Gardiner | July 19, 1949 |
| 2,564,484 | Kuehni | Aug. 14, 1951 |